United States Patent
Yamada et al.

[11] Patent Number: 5,980,703
[45] Date of Patent: Nov. 9, 1999

[54] ELECTROLYTIC CELL FOR PRODUCING ACIDIC WATER AND ALKALINE WATER

[75] Inventors: Kuniaki Yamada; Seiichi Anzai; Masashi Tanaka, all of Kanagawa; Takayuki Shimamune, Tokyo; Yoshinori Nishiki, Kanagawa; Naoaki Sakurai, Kanagawa; Naoya Hayamizu, Kanagawa; Hiroshi Fujita, Kanagawa, all of Japan

[73] Assignees: Permelec Electrode Ltd.; Kabushiki Kaisha Toshiba, both of Kanagawa, Japan

[21] Appl. No.: 09/053,781

[22] Filed: Apr. 2, 1998

[30] Foreign Application Priority Data

Apr. 16, 1997 [JP] Japan .................................. 9-115291

[51] Int. Cl.$^6$ ........................................................ C02F 1/461
[52] U.S. Cl. ........................ 204/253; 204/230.2; 204/633
[58] Field of Search ............................... 204/253, 230.2, 204/633

[56] References Cited

U.S. PATENT DOCUMENTS 5,725,753  3/1988  Harada et al. ............................ 205/746

Primary Examiner—Arun S. Phasge
Attorney, Agent, or Firm—Sughrue, Mion, Zinn, Macpeak & Seas, PLLC

[57] ABSTRACT

An electrolytic cell for producing acidic water and alkaline water is disclosed. High-purity acidic water and high-purity alkaline water can be produced in a well balanced proportion from ultrapure water which is supplied in the minimum amount necessary for producing the desired acidic and alkaline waters using the minimum amount of electricity. The electrolytic cell includes an electrolytic acidic-water production unit 3 comprising an anode chamber 6 and an auxiliary cathode chamber 7 separated therefrom by a first ion-exchange membrane 5, and an electrolytic alkaline-water production unit 4 comprising a cathode chamber 10 and an auxiliary anode chamber 9 separated therefrom by a second ion-exchange membrane 8. Separately controllable power supplies are also provided for supplying power to each of the two units. The supply amount of pure water and the amount of electricity used can be fixed according to the desired amounts of acidic and alkaline waters. Thus, wasteful use of ultrapure water and electric power can be avoided.

15 Claims, 1 Drawing Sheet

ELECTROLYTIC CELL FOR PRODUCING ACIDIC WATER AND ALKALINE WATER

FIELD OF THE INVENTION

The present invention relates to an electrolytic cell adapted for producing high-purity acidic water and/or alkaline water, both of which are not contaminated with a metal. The high-purity acidic water and/or alkaline water thus produced is useful for cleaning electronic devices, e.g., semiconductors and liquid crystals.

BACKGROUND OF THE INVENTION

In producing and cleaning electronic parts, media specially prepared for these purposes conventionally include, for example, sulfuric acid, hydrofluoric acid, hydrogen peroxide and hydrochloric acid. These cleaning media continue to be suitably used depending on the intended application. However, these cleaning media are obtained by specially purifying corresponding products produced through chemical processes. The purification operations are complicated because they involve the step of removing metallic ingredients which have been introduced into the chemical products, for example, from the catalysts used in producing the same. As a result, the purified products are expensive. In addition, even if the purification operations are carefully conducted, the thus-purified products cannot always satisfy the reduction in allowable impurity levels required by advances in electronic devices. New substitute techniques are hence desired.

One of these substitute techniques is the use of ozonized water. In particular, highly ozonized water produced by electrolysis is known to be exceedingly effective, e.g., in cleaning electronic devices. However, because the use of ozonized water alone is insufficient in some cases, there is a growing need for a treatment liquid which has one or more functions not possessed by ozonized water, e.g., an oxidizing function and a reducing function, and which furthermore does not contain metallic elements.

Among such treatment liquids is so-called acidic water or ultra-acidic water. Acidic water generally has a pH of 3 or lower and an oxidation-reduction potential (ORP) of 1.2 V or higher and hence has an oxidizing ability. Consequently, the acidic water has the effect of, for example, decomposing organic substances or dissolving metallic deposits therein to remove these impurities, and has come to be used for the cleaning of electronic devices, etc.

Simultaneously with the production of the acidic water in an electrolytic cell, alkaline water having a pH of 10 or higher and an ORP of 0 V or lower is produced as a by-product in the cathode chamber of the electrolytic cell. Use of this alkaline water for cleaning, etc., has reached a stage of practical use.

These modified acidic and alkaline waters (electrolytic active waters or electrolytic ionic waters) have the same cleaning effect as reagents such as high-purity acids, alkalis, and hydrogen peroxide. Since the electrolytic active waters are markedly inexpensive, a considerable cost reduction is attainable.

In the electrolytic production of acidic water and alkaline water, a two-chamber type electrolytic cell is generally used which is partitioned into an anode chamber and a cathode chamber with an ion-exchange membrane serving as a diaphragm. For conducting electrolysis using this type of electrolytic cell, an appropriate supporting electrolyte is added to electrolyte liquids in order to impart ionic conductivity thereto. However, the cleaning waters thus produced mostly contain the supporting electrolyte remaining therein or are contaminated with metallic ions and particles which are attributable to the dissolution of material constituting the inner wall of the electrolytic cell main body by the electrolytic solutions. If such contaminated cleaning waters are used for cleaning electronic devices such as semiconductors and liquid crystals, metallic ions and other contaminants contained in the cleaning waters adhere to semiconductor surfaces and these adherent impurities cause problems such as insulation failures.

Consequently, for producing high-purity acidic water and alkaline water for use in, e.g., the cleaning of electronic devices, electrolysis is conducted using electrolytic liquids not containing an electrolyte dissolved therein and using an ion-exchange membrane so that the membrane itself functions as a solid electrolyte. In this method, when ultrapure water is used as an anolyte and a catholyte, almost no impurities are introduced into the anolyte and catholyte used as feedstocks or into the acidic water and alkaline water thus produced. Namely, the desired high-purity acidic water and alkaline water can be produced.

In the above electrolysis, the efficiency of producing acidic water (anode water) in the anode chamber and the efficiency of producing alkaline water (cathode water) in the cathode chamber vary depending on the kind of feedstock water, the kind of electrode catalyst, and electrolytic conditions including the current density. Furthermore, the required amount of acidic water and alkaline water vary depending on the intended purpose. Consequently, when a single electrolytic cell (which may be either a two-chamber or three-chamber cell) is used for simultaneously yielding acidic water and alkaline water, one of the waters tends to be produced in excess and this causes a cost increase. Although it is desirable to suitably regulate the production amount of acidic water and alkaline water as needed, this regulation is virtually impossible in a conventional apparatus.

In a conventional electrolytic cell for use in producing high-purity acidic water and high-purity alkaline water, electrolysis is conducted while adding water, especially ultrapure water, to the single electrolytic cell on the anode side and the cathode side as needed to thereby simultaneously obtain acidic water and alkaline water in the single electrolytic cell. This technique generally yields alkaline water in excess, and the excess alkaline water is discarded. However, when ultrapure water, in particular, is used as an electrolyte liquid, it is exceedingly uneconomical to discard the excess product, e.g., alkaline water, because ultrapure water itself is very expensive and much time is required to produce the same.

Furthermore, the conventional electrolytic cell described above has an unsolved problem in that the electrode material moves, although in a slight amount, through the ion-exchange membrane to the counter-electrode side to reduce the purity of the electrolytic water thus produced. Because this dissolution of electrode material occurs in an amount of about several tens of ppb at the most, contamination therewith poses no problem in ordinary applications for which feedstock water having a purity on the same level as ion-exchanged water is used. However, contamination with the electrode material exceeds the allowable impurity levels for acidic or alkaline water for electronic-device cleaning.

SUMMARY OF THE INVENTION

It is therefore an object of the present invention to provide an electrolytic cell for producing acidic water and alkaline water which solves the above described problems of the prior art, namely, an electrolytic cell capable of yielding acidic water and alkaline water, by electrolysis of ultrapure water, only in the respective necessary amounts while maintaining an appropriate balance therebetween, whereby all of the electrolytic water thus produced can be effectively utilized without the need of discarding excess product, and which is effective in minimizing the contamination caused by dissolution of the electrode material.

The above objectives of the present invention are achieved by providing an electrolytic cell for producing acidic water in an anode chamber including an anode and alkaline water in a cathode chamber including a cathode by the electrolysis of ultrapure water, said electrolytic cell comprising an electrolytic acidic-water production unit comprising the anode chamber and an auxiliary cathode chamber including an auxiliary cathode separated therefrom by a first ion-exchange membrane, an electrolytic alkaline-water production unit comprising the cathode chamber and an auxiliary anode chamber including an auxiliary anode separated therefrom by a second ion-exchange membrane, and separately controllable power supplies for supplying power to said electrolytic acidic-water production unit and said electrolytic alkaline-water production unit, respectively. This electrolytic cell can constitute either a two-chamber type or three-chamber type electrolytic cell.

Figure 1:
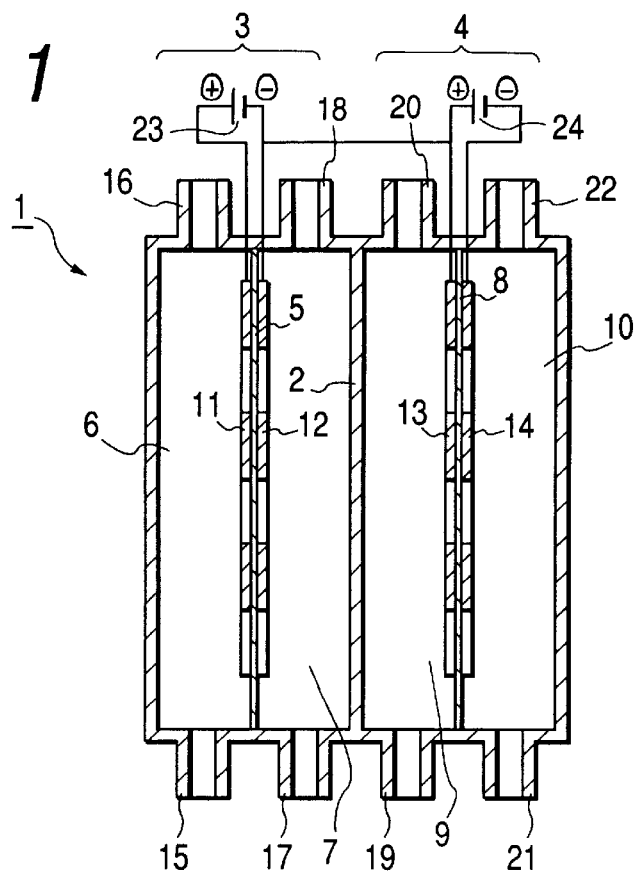
FIG. 1 is a diagrammatic vertical sectional view illustrating one embodiment of a two-chamber type multi-electrode electrolytic cell according to the present invention.
Figure 2:
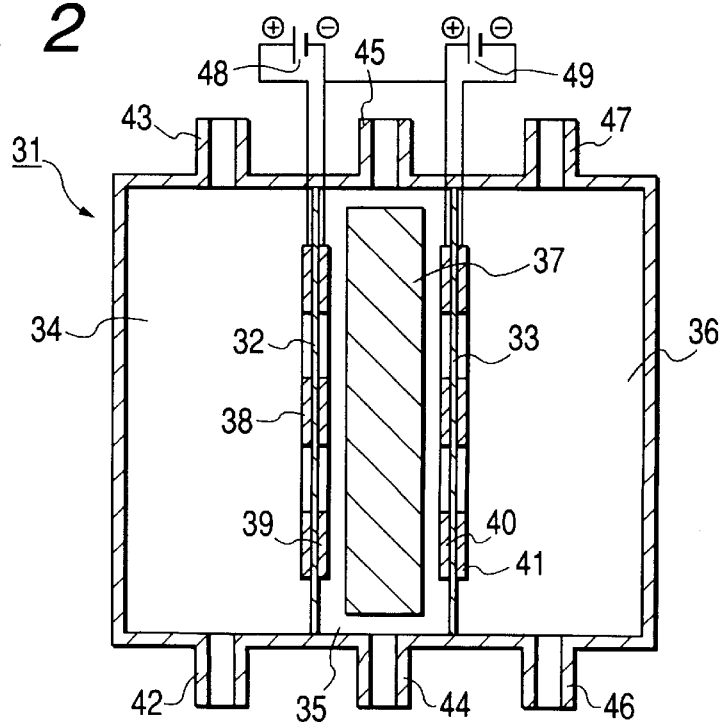
FIG. 2 is a diagrammatic vertical sectional view illustrating one embodiment of a three-chamber type multi-electrode electrolytic cell according to the present invention.

The structural elements identified by the reference numbers in FIGS. 1 and 2 are as follows.

1 . . . electrolytic cell main body, 2 . . . partition wall, 3 . . . electrolytic acidic-water production unit, 4 . . . electrolytic alkaline-water production unit, 5 . . . first cation-exchange membrane, 6 . . . anode chamber, 7 . . . auxiliary cathode chamber, 8 . . . second cation exchange membrane, 9 . . . auxiliary anode chamber, 10 . . . cathode chamber, 11 . . . anode, 12 . . . auxiliary cathode, 13 . . . auxiliary anode, 14 . . . cathode, 15 . . . anolyte inlet, 16 . . . anolyte outlet, 17 . . . auxiliary catholyte inlet, 18 . . . auxiliary catholyte outlet, 19 . . . auxiliary anolyte inlet, 20 . . . auxiliary anolyte outlet, 21 . . . catholyte inlet, 22 . . . catholyte outlet, 23 . . . first power supply, 24 . . . second power supply, 31 electrolytic cell main body, 32 . . . first cation-exchange membrane, 33 . . . second cation-exchange membrane, 34 . . . anode chamber, 35 . . . intermediate chamber, 36 . . . cathode chamber, 37 . . . spacer, 38 . . . anode, 39 . . . auxiliary cathode, 40 . . . auxiliary anode, 41 . . . cathode, 42 . . . anolyte inlet, 43 . . . anolyte outlet, 44 . . . intermediate-chamber electrolyte inlet, 45 . . . intermediate-chamber electrolyte outlet, 46 . . . catholyte inlet, 47 . . . catholyte outlet, 48 . . . first power supply, 49 . . . second power supply.

DETAILED DESCRIPTION OF THE INVENTION

A characteristic feature of the electrolytic cell of the present invention is that the power supplies for acidic-water production and alkaline-water production are separately controlled. This enables the amount of electricity used for acidic-water production and alkaline-water production to be separately maintained at their respective optimal values. In other words, the electrolytic cell comprises an electrolytic acidic-water production unit in which acidic water is produced and an electrolytic alkaline-water production unit in which alkaline water is produced. In the electrolytic acidic-water production unit, in which the desired high-purity acidic water is produced in an anode chamber, ultrapure water is supplied only to the anode chamber. Also, the power supply for this unit is regulated so as to supply electric current just in an amount needed for obtaining the desired amount of acidic water. In the electrolytic alkaline-water production unit, in which the desired high-purity alkaline water is produced in a cathode chamber, ultrapure water is supplied only to the cathode chamber. Also, the power supply for this unit is regulated so as to supply electric current just in an amount needed for obtaining the desired amount of alkaline water.

Thus, ultrapure water can be supplied in the minimum amount needed to produce the desired amounts of high-purity acidic water and alkaline water.

The apparatus of the present invention can either be a two-chamber type electrolytic cell or a three-chamber type electrolytic cell. Where the apparatus of the invention is constituted as a two-chamber type electrolytic cell, it comprises a first electrolytic cell for producing acidic water and a second electrolytic cell for producing alkaline water. These two constituent electrolytic cells may be separately disposed, or may be united to constitute a multi-electrode electrolytic cell in which the two constituent cells are separated by a partition wall. The cathode chamber of the first electrolytic cell and the anode chamber of the second electrolytic cell function as an auxiliary cathode chamber and an auxiliary anode chamber, respectively. Although ultrapure water is desirably supplied to the auxiliary electrode chambers, relatively inexpensive water, e.g., ion-exchanged water or another water comparable thereto in purity, can be supplied to the auxiliary electrode chambers. This is because these chambers are not used for producing high-purity acidic water and alkaline water. Regardless of whether the first and second electrolytic cells are disposed separately or are united to constitute a multi-electrode electrolytic cell, it is desirable to regulate the cathode of the auxiliary cathode chamber and the anode of the auxiliary anode chamber so as to have the same potential in order to avoid unnecessary energy consumption.

In the two-chamber type electrolytic cell, the auxiliary cathode chamber of the electrolytic acidic-water production unit need not be supplied with an electrolyte liquid. This is because water moves from the anode chamber into the cathode chamber, together with the permeation of cations, in an amount as large as several times (by mole) of the cation amount. In the case of supplying water to the auxiliary cathode chamber, the water need not be ultrapure water and may be a relatively inexpensive water, e.g., ion-exchanged water or another water comparable thereto in purity. Furthermore, the auxiliary anode chamber of the electrolytic alkaline-water production unit also need not be supplied with ultrapure water.

Electrolysis is conducted while causing electric current to flow through the anode of the electrolytic acidic-water production unit and the cathode of the auxiliary cathode chamber in a quantity corresponding to the desired amount of acidic water, and supplying ultrapure water to the anode chamber of the electrolytic acidic-water production unit in the minimum amount necessary for the desired amount of acidic water. As a result, acidic water can be produced in the anode chamber in just the desired amount without wasting ultrapure water and power. Alkaline water is produced in the same manner. Namely, electrolysis is conducted while supplying electricity and ultrapure water to the electrolytic alkaline-water production unit in the respective calculated amounts, whereby alkaline water can be produced in the cathode chamber of the electrolytic alkaline-water production unit in just the desired amount without wasting ultrapure water and power.

Where the electrolytic cell of the present invention is constituted as a three-chamber type electrolytic cell, an intermediate chamber, which functions as the auxiliary cathode chamber and auxiliary anode chamber described above, is interposed between an anode chamber for acidic-water production and a cathode chamber for alkaline-water production. Conventional two-chamber type electrolytic cells have a problem in that anode material which has dissolved in the anolyte is introduced into the cathode chamber due to the movement of water accompanying the permeation of cations through the cation-exchange membrane. In the three-chamber type electrolytic cell, however, even when a slight amount of anode material is introduced into the intermediate chamber, the anode material as such hardly moves through the cation-exchange membrane into the cathode chamber. This, in turn, prevents the alkaline water produced in the cathode chamber from becoming contaminated. The intermediate chamber does not directly participate in producing the desired acidic water and alkaline water, and is not needed for conducting an electrolytic reaction therein. Rather, it is desirable to regulate the anode and cathode of the intermediate chamber to the same potential so as to prevent an electrolytic reaction from occurring therein and to thus prevent the generation of unnecessary substances. Because an electrolytic reaction does not occur in the intermediate chamber, unnecessary ions are not generated and hence the amount of ions permeating the ion-exchange membrane is not increased. Thus, the ion-exchange membrane is spared from contamination.

In this three-chamber type electrolytic cell, electrolysis is also conducted while causing electric current to flow through the anode of the anode chamber and the auxiliary cathode of the intermediate chamber, and through the auxiliary anode of the intermediate chamber and the cathode of the cathode chamber, in respective quantities corresponding to the desired amounts of acidic water and alkaline water. The electrolysis is also conducted while supplying ultrapure water to the anode chamber and the cathode chamber in the respective minimum amounts needed to produce the desired amounts of acidic water and alkaline water. As a result, acidic water and alkaline water can be produced in the anode chamber and the cathode chamber in just the respective the desired amounts without wasting ultrapure water and power. The intermediate chamber may be supplied with ion-exchanged water.

In the present invention, a perfluorocarbon cation-exchange membrane excellent in various resistance properties is desirably used as the diaphragm for partitioning the electrolytic cell into an anode chamber and a cathode chamber or into an anode chamber, an intermediate chamber and a cathode chamber. Perfluorocarbon cation-exchange membranes are classified into two kinds, namely, sulfonate type perfluoro-carbon cation-exchange membranes and carboxylate type perfluorocarbon cation-exchange membranes. Because these cation-exchange membranes have exceedingly high resistance, stable electrolysis operation is possible therewith. However, because corrosive substances which can damage ion-exchange membranes is not produced in the present invention other than acidic water and alkaline water, a hydrocarbon type cation-exchange membrane, which is inexpensive although slightly inferior in corrosion resistance, may be used from the standpoint of economy.

The anode used in the anode chamber for acidic-water production desirably has a coating of an anode material which does not dissolve in the anolyte during acidic-water production. Examples of the anode material include platinum group metals such as platinum, ruthenium, iridium, rhodium, palladium, and osmium and oxides of platinum group metals, such as ruthenium oxide and iridium oxide. The cathode used in the cathode chamber for alkaline-water production desirably employs platinum or ruthenium oxide as a cathode material. These substances, when used as a cathode material, exhibit extremely reduced electrolytic consumption. Because these substances have a low overvoltage, use thereof is also effective in conducting electrolysis at a reduced voltage. If a metal such as stainless steel, nickel or titanium is used as a cathode in place of, e.g., platinum or ruthenium oxide, not only is there an increased overvoltage results which in turn increases the electrolytic voltage and the power cost, but also the cathode is considerably consumed by electrolysis to release metal ions which are introduced into the alkaline water thus produced. Use of the resultant alkaline water for cleaning semiconductors or liquid crystals results in an increased risk of insulation failure by the metal ions.

A cathode collector, when used, is preferably made of zirconium. This is because a collector not made of zirconium but stainless-steel or nickel considerably dissolves in the catholyte, and the alkaline water obtained with this collector is unsuitable for use in cleaning electronic devices.

The electrode used in the auxiliary anode chamber, the auxiliary cathode chamber or the intermediate chamber preferably has catalytic properties sufficient to cause the ordinary electrolysis of water, because this electrode does not directly participate in the production of acidic water or alkaline water. In selecting electrodes for use in these chambers, the property of not contaminating the acidic water and alkaline water being produced is more important than catalytic performance. For example, an electrode comprising a platinum group metal or an oxide thereof, e.g., platinum, iridium oxide, or ruthenium oxide, is preferably used as the cathode of the auxiliary anode chamber or intermediate chamber. Namely, even when such materials dissolve in the electrolyte liquid, their dissolution only yields anions which hardly permeate the cation-exchange membrane interposed between the auxiliary anode chamber or intermediate chamber and the cathode chamber for alkaline-water production. Thus, the alkaline water in the cathode chamber can be protected from contamination.

As described above, the current which flows through the anode and the auxiliary cathode in the electrolytic acidic-water production unit and the current which flows through the auxiliary anode and the cathode in the electrolytic alkaline-water production unit are separately controllable. Although one DC power supply may be used to separately control the two current flows, separate power supplies may be used. In the latter case, when the power supply for the anolyte and the power supply for the catholyte are regulated so as to always be minus and plus, respectively, the intermediate chamber or a point having the common potential can be grounded. This apparatus is advantageous in that the voltage as a whole can be low. In addition, commercial power supplies can be easily used in combination. Hence, a cost reduction can be attained.

There are cases where the acidic water and alkaline water thus produced contain a minute amount of cations and anions as impurities. These cationic or anionic impurities may be removed by passing the acidic or alkaline water obtained according to the present invention through a column packed with a cationic resin or an anionic resin and installed outside the electrolytic cell, to thereby obtain acidic or alkaline water having an even higher purity.

FIG. 1 is a diagrammatic vertical sectional view illustrating one embodiment of a two-chamber type multi-electrode electrolytic cell according to the present invention.

The electrolytic cell main body 1 is partitioned with a partition wall 2 into an electrolytic acidic-water production unit 3 and an electrolytic alkaline-water production unit 4. The electrolytic acidic-water production unit 3 is partitioned into an anode chamber 6 and an auxiliary cathode chamber 7 with a first cation-exchange membrane 5, while the electrolytic alkaline-water production unit 4 is partitioned into an auxiliary anode chamber 9 and a cathode chamber 10 with a second cation-exchange membrane 8. The first cation-exchange membrane 5 has an anode 11 comprising a porous insoluble material and an auxiliary cathode 12 comprising porous platinum; the anode 11 and the auxiliary cathode 12 are in intimate contact with the membrane 5 on the anode chamber side and on the auxiliary cathode chamber side, respectively. The second cation-exchange membrane 8 has an auxiliary anode 13 comprising a porous insoluble material and a cathode 14 comprising porous platinum; the auxiliary anode 13 and the cathode 14 are in intimate contact with the membrane 8 on the auxiliary anode chamber side and on the cathode chamber side, respectively.

The anode chamber 6, the auxiliary cathode chamber 7, the auxiliary anode chamber 9 and the cathode chamber 10 have an anolyte inlet 15 and an anolyte outlet 16, an auxiliary catholyte inlet 17 and an auxiliary catholyte outlet 18, an auxiliary anolyte inlet 19 and an auxiliary anolyte outlet 20, and a catholyte inlet 21 and a catholyte outlet 22, respectively, formed in the base plate and top plate of each chamber. Furthermore, a first power supply 23 is connected to the anode 11 and the auxiliary cathode 12, while a second power supply 24 is connected to the auxiliary anode 13 and the cathode 14. The auxiliary cathode 12 and the auxiliary anode 13 are connected to each other by a lead wire so as to be kept at the same potential.

For producing high-purity acidic water and alkaline water in the electrolytic cell main body 1 having the structure described above, the amounts of ultrapure water and electricity to be supplied according to the desired amounts of acidic water and alkaline water are calculated prior to the initiation of electrolysis. Thereafter, electric current supplied from the first power supply 23 is caused to flow through the anode 11 and the auxiliary cathode 12 in a quantity corresponding to the desired amount of acidic water, and electric current supplied from the second power supply 24 is caused to flow through the auxiliary anode 13 and the cathode 14 in a quantity corresponding to the desired amount of alkaline water. At the same time, ultrapure water is supplied to the anode chamber 6 through the anolyte inlet 15 in an amount corresponding to the desired amount of acidic water and ultrapure water is supplied to the cathode chamber 10 through the catholyte inlet 21 in an amount corresponding to the desired amount of alkaline water. An electrolyte liquid (pure water) which is inexpensive and has a relatively high purity, e.g., ion-exchanged water, is supplied to the auxiliary cathode chamber 7 and the auxiliary anode chamber 9.

As a result, acidic water and alkaline water are produced in the anode chamber 6 and the cathode chamber 10, respectively, in just their desired amounts. In other words, these waters are produced using ultrapure water and electricity in the respective minimum amounts.

FIG. 2 is a diagrammatic vertical sectional view illustrating one embodiment of a three-chamber type multi-electrode electrolytic cell according to the present invention.

The electrolytic cell main body 31 is partitioned into an anode chamber 34, an intermediate chamber 35 and a cathode chamber 36 with a first cation-exchange membrane 32 and a second cation-exchange membrane 33. Most of the space inside the intermediate chamber 35 is occupied by a spacer 37. The first cation-exchange membrane 32 has a porous anode 38 and an auxiliary cathode 39 which are in intimate contact with the membrane 32 on the anode chamber side and on the intermediate chamber side, respectively. The second cation-exchange membrane 33 has a porous auxiliary anode 40 and a porous cathode 41 which are in intimate contact with the membrane 33 on the intermediate chamber side and on the cathode chamber side, respectively.

The anode chamber 34, the intermediate chamber 35 and the cathode chamber 36 have an anolyte inlet 42 and an anolyte outlet 43, an intermediate-chamber electrolyte inlet 44 and an intermediate-chamber electrolyte outlet 45, and a catholyte inlet 46 and a catholyte outlet 47, respectively, formed in the base plate and top plate of each chamber. Furthermore, a first power supply 48 is connected to the anode 38 and the auxiliary cathode 39, while a second power supply 49 is connected to the auxiliary anode 40 and the cathode 41. The auxiliary cathode 39 and the auxiliary anode 40 are connected to each other by a lead wire so as to be kept at the same potential.

For producing high-purity acidic water and alkaline water in the electrolytic cell main body 31 having the structure described above, the amounts of ultrapure water and electricity to be supplied according to the desired amounts of acidic water and alkaline water are calculated prior to the initiation of electrolysis, as in the case of the apparatus shown in FIG. 1. Thereafter, electric current supplied from the first power supply 48 is caused to flow through the anode 38 and the auxiliary cathode 39 in a quantity corresponding to the desired amount of acidic water, and electric current supplied from the second power supply 49 is caused to flow through the auxiliary anode 40 and the cathode 41 in a quantity corresponding to the desired amount of alkaline water. At the same time, ultrapure water is supplied to the anode chamber 34 and the cathode chamber 36 in respective amounts corresponding to the desired amounts of acidic water and alkaline water, as in the case of the apparatus shown in FIG. 1. Ion-exchanged water or the like is supplied to the intermediate chamber 35.

As a result, acidic water and alkaline water are produced in the anode chamber 34 and the cathode chamber 36, respectively, in just their desired amounts. In other words, these waters are produced using ultrapure water and electricity in the respective minimum amounts.

An example of producing acidic water and alkaline water using an electrolytic cell according to the present invention is given below. However, this Example should not be construed as limiting the scope of the invention.

EXAMPLE 1

The electrolytic cell shown in FIG. 1 was used for producing acidic water and alkaline water.

Nafion 117 (manufactured by E.I. du Pont de Nemours & Co.) was used as a cation-exchange membrane. A porous anode made of titanium having an iridium oxide catalyst supported thereon and a cathode made of titanium having a platinum catalyst supported thereon were attached to the cation-exchange membrane so as to be in intimate contact therewith on the anode side and the cathode side, respectively.

A box-shaped electrolytic cell was partitioned into two parts with a partition wall made of a fluororesin to thereby form a multi-electrode electrolytic cell composed of an electrolytic acidic-water production unit and an electrolytic alkaline-water production unit. The cation-exchange membrane having the anode and cathode closely attached thereto was fitted to each of the two units to thereby partition the electrolytic acidic-water production unit into an anode chamber and an auxiliary cathode chamber and the electrolytic alkaline-water production unit into an auxiliary anode chamber and a cathode chamber.

The necessary amounts of ultrapure water and electricity were calculated based on desired amounts of acidic water and alkaline water of 420 l/hr and 420 l/hr, respectively. As a result, the calculated amounts of ultrapure water and electricity to be supplied for producing acidic water were 420 l/hr and 120 A, respectively, while those to be supplied for producing alkaline water were 120 l/hr and 60 A, respectively.

Ultrapure water was supplied to the anode chamber and the cathode chamber in the respective calculated amounts, while causing electric current to flow through the anode and the auxiliary cathode and through the auxiliary anode and the cathode using the first and second power supplies. As a result, acidic water was produced in the anode chamber in the desired amount, and alkaline water was produced in the cathode chamber in the desired amount. The acidic water and alkaline water thus produced each had an impurity content of not higher than 100 ppt with respect to each element.

COMPARATIVE EXAMPLE 1

The cation-exchange membrane having an anode and a cathode both closely attached thereto as fabricated in Example 1 was used to form an electrolytic cell composed of an anode chamber and a cathode chamber. Electric current was caused to flow through the anode and the cathode at 120 A/hr while supplying ultrapure water to the anode chamber and the cathode chamber at rates of 420 l/hr and 420 l/hr, respectively. As a result, acidic water and alkaline water were produced at rates of 420 l/hr and 420 l/hr, respectively. The amounts of acidic water and alkaline water thus produced could not be independently increased or reduced. Namely, alkaline water was produced in an amount larger than the desired amount. The acidic water and alkaline water thus produced each had an impurity content of not higher than 100 ppt.

As described above, the electrolytic cell of the present invention for producing acidic water in an anode chamber and alkaline water in a cathode chamber by the electrolysis of ultrapure water comprises an electrolytic acidic-water production unit comprising the anode chamber and an auxiliary cathode chamber separated therefrom by a first ion-exchange membrane, an electrolytic alkaline-water production unit comprising the cathode chamber and an auxiliary anode chamber separated therefrom by a second ion-exchange membrane, and second separately controllable power supplies for supplying power to the electrolytic acidic-water production unit and the electrolytic alkaline-water production unit, respectively.

In the present invention, acidic water and alkaline water are produced in an electrolytic acidic-water production unit and an electrolytic alkaline-water production unit, respectively. Each employs as a diaphragm an ion-exchange membrane which functions as a solid electrolyte. Also, separately controllable power supplies are provided for supplying power to each unit. Because the two units are separately controllable, the amounts of ultrapure water and electricity to be supplied depending on the desired amounts of acidic water and alkaline water to be produced can be fixed and controlled independently with respect to the acidic-water production and alkaline-water production, respectively. Furthermore, because each ion-exchange membrane functions as an electrolyte, there is no need to separately add an electrolyte. Namely, the problem of a conventional apparatus which results in contamination of the acidic water and alkaline water thus produced with an added electrolyte is eliminated, and high-purity acidic water and high-purity alkaline water can be obtained. Therefore, using the minimum necessary amount of ultrapure water, which is expensive, high-purity acidic water and high-purity alkaline water can be efficiently produced at a far lower cost than in the prior art techniques. The quantity of electricity used can also be minimized according to the acidic water and alkaline water to be produced. Thus, economical operation is possible in these two respects.

Although the electrolytic cell of the present invention can be fabricated as either a two-chamber type or three-chamber type cell, each electrolytic cell can be operated to produce the desired amounts of acidic water and alkaline water using ultrapure water and electricity in the respective minimum necessary amounts for the reasons stated above. In the case of a two-chamber type cell, the movement of impurities is prevented because the constituent electrolytic cells (electrolytic cell units) are separated by a partition wall or the like, whereby high-purity acidic water and high-purity alkaline water can be produced. In the case of a three-chamber type cell, the movement of impurities from the anode chamber to the cathode chamber is inhibited by the presence of the intermediate chamber, whereby high-purity acidic water and high-purity alkaline water can be obtained.

The two-chamber type electrolytic cell and the three-chamber type electrolytic cell each is desirably operated so that the auxiliary cathode and the auxiliary anode have the same potential. This potential regulation is intended mainly to avoid a waste of energy in the case of two-chamber type electrolytic cell, and inhibits unnecessary reactions from occurring in the intermediate chamber in the case of the three-chamber type electrolytic cell.

While the invention has been described in detail and with reference to specific embodiments thereof, it will be apparent to one skilled in the art that various changes and modifications can be made therein without departing from the spirit and scope thereof.

What is claimed is:

1. An electrolytic cell for producing acidic water in an anode chamber including an anode and alkaline water in a cathode chamber including a cathode by the electrolysis of ultrapure water, said electrolytic cell comprising an electrolytic acidic-water production unit comprising the anode chamber and an auxiliary cathode chamber including an auxiliary cathode separated therefrom by a first ion-exchange membrane, an electrolytic alkaline-water production unit comprising the cathode chamber and an auxiliary anode chamber including an auxiliary anode separated therefrom by a second ion-exchange membrane, and separately controllable power supplies for supplying power to each of said electrolytic acidic-water production unit and said electrolytic alkaline-water production unit.

2. The electrolytic cell of claim 1, further comprising means for regulating the cathode of the auxiliary cathode chamber and the anode of the auxiliary anode chamber to have the same electric potential.

3. The electrolytic cell of claim 1, wherein said electrolytic acidic-water production unit is separately disposed from said electrolytic alkaline-water production unit.

4. The electrolytic cell of claim 1, wherein said electrolytic acidic-water production unit adjoins said electrolytic alkaline-water production unit via a partition wall.

5. The electrolytic cell of claim 1, wherein the cathode of the auxiliary cathode chamber and the anode of the auxiliary anode chamber are electrically connected.

6. The electrolytic cell of claim 1, wherein the anode of the anode chamber and the auxiliary cathode of the auxiliary cathode chamber are in intimate contact with the first ion-exchange membrane and the cathode of the cathode chamber and the anode of the auxiliary anode chamber are in intimate contact with the second ion-exchange membrane.

7. The electrolytic cell of claim 1, wherein said separately controllable power supplies comprise first and second power supplies.

8. A two-chamber electrolytic cell for producing acidic water in an anode chamber including an anode and alkaline water in a cathode chamber including a cathode by the electrolysis of ultrapure water, said electrolytic cell comprising a first electrolytic cell unit partitioned into the anode chamber and an auxiliary cathode chamber including an auxiliary cathode with a first ion-exchange membrane, a second electrolytic cell unit partitioned into the cathode chamber and an auxiliary anode chamber including an auxiliary anode with a second ion-exchange membrane, and separately controllable power supplies for supplying power to each of said first electrolytic cell unit and said second electrolytic cell unit.

9. The electrolytic cell of claim 8, further comprising means for regulating the cathode of the auxiliary cathode chamber and the anode of the auxiliary anode chamber to have the same electric potential.

10. The electrolytic cell of claim 8, wherein the cathode of the auxiliary cathode chamber and the anode of the auxiliary anode chamber are electrically connected.

11. The electrolytic cell of claim 8, wherein the anode of the anode chamber and the auxiliary cathode of the auxiliary cathode chamber are in intimate contact with the first ion-exchange membrane and the cathode of the cathode chamber and the anode of the auxiliary anode chamber are in intimate contact with the second ion-exchange membrane.

12. A three-chamber electrolytic cell for producing acidic water in an anode chamber including an anode and alkaline water in a cathode chamber including a cathode by the electrolysis of ultrapure water, said electrolytic cell being partitioned into an anode chamber, an intermediate chamber including an auxiliary anode and an auxiliary cathode and a cathode chamber with first and second ion-exchange membranes, the anode of the anode chamber and the auxiliary cathode of the intermediate chamber being in intimate contact with the first ion-exchange membrane, the cathode of the cathode chamber and the auxiliary anode of the intermediate chamber being in intimate contact with the second ion-exchange membrane, said electrolytic cell further comprising means for regulating the auxiliary anode and auxiliary cathode of the intermediate chamber to have the same electric potential, and means for separately controlling the quantity of electric current flowing through the anode of the anode chamber and the auxiliary cathode of the intermediate chamber and for separately controlling the quantity of electric current flowing through the auxiliary anode of the intermediate chamber and the cathode of the cathode chamber.

13. The three-chamber electrolytic cell of claim 12, wherein said intermediate chamber is interposed between said anode chamber and said cathode chamber.

14. The three-chamber electrolytic cell of claim 12, wherein said means for separately controlling the quantity of electric current comprises first and second separately controllable power supplies.

15. The electrolytic cell of claim 12, wherein the auxiliary anode and the auxiliary cathode of the intermediate chamber are electrically connected.

* * * * *